United States Patent
Kugler et al.

(10) Patent No.: US 9,586,556 B2
(45) Date of Patent: Mar. 7, 2017

(54) ADJUSTING DEVICE FOR A FRONT LID AND ASSOCIATED MOTOR VEHICLE

(71) Applicant: AUDI AG, Ingolstadt (DE)

(72) Inventors: Peter Kugler, Donauwörth (DE); Wolfgang Dorfner, Buxheim (DE); Harald Sternecker, Beilngries (DE); Bernhard-Konrad Pfaller, Denkendorf (DE); Istvan Virag, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/518,499

(22) Filed: Oct. 20, 2014

(65) Prior Publication Data
US 2015/0107930 A1 Apr. 23, 2015

(30) Foreign Application Priority Data
Oct. 21, 2013 (DE) .......................... 10 2013 017 456

(51) Int. Cl.
*B60R 21/38* (2011.01)
*B62D 25/12* (2006.01)
*E05F 15/60* (2015.01)

(52) U.S. Cl.
CPC ............. *B60R 21/38* (2013.01); *E05F 15/60* (2015.01)

(58) Field of Classification Search
CPC .................................. B60R 21/38; B62D 25/12
USPC ................. 74/479.01, 480 R, 490.03, 89.23; 296/187.01; 180/69.21
See application file for complete search history.

(56) References Cited

U.S. PATENT DOCUMENTS

| | | | | |
|---|---|---|---|---|
| 4,466,307 A | * | 8/1984 | Kouno | B25J 9/046 414/1 |
| 6,293,362 B1 | * | 9/2001 | Sasaki | E05B 77/08 180/274 |
| 7,374,008 B1 | * | 5/2008 | Neal | B60R 21/38 180/274 |
| 2002/0014367 A1 | * | 2/2002 | Sasaki | B60R 21/38 180/274 |
| 2005/0151393 A1 | * | 7/2005 | Borg | B60R 21/38 296/187.09 |
| 2007/0102219 A1 | * | 5/2007 | Park | B60R 21/38 180/274 |
| 2008/0042461 A1 | * | 2/2008 | Schafer | B60R 21/38 296/1.04 |
| 2012/0000304 A1 | * | 1/2012 | Hamminga | E05F 15/622 74/89.23 |
| 2015/0107929 A1 | * | 4/2015 | Kugler | B60R 21/38 180/274 |
| 2015/0108770 A1 | * | 4/2015 | Kugler | B60R 21/38 292/201 |
| 2015/0240547 A1 | * | 8/2015 | Fischer | F16H 25/20 74/89.4 |

FOREIGN PATENT DOCUMENTS

| | | |
|---|---|---|
| DE | 198 33 612 | 1/2000 |
| DE | 101 16 716 | 10/2002 |

(Continued)

*Primary Examiner* — Ruth Ilan
(74) *Attorney, Agent, or Firm* — Henry M. Feiereisen LLC

(57) ABSTRACT

Adjusting device for a front lid, with an actuator for raising the rear edge of the front lid, wherein the actuator has a first linear drive which enables a substantially vertical movement of the front lid and a second linear drive which enables a substantially horizontal movement of the front lid.

6 Claims, 3 Drawing Sheets

(56) References Cited

FOREIGN PATENT DOCUMENTS

| | | | |
|---|---|---|---|
| DE | 102 53 441 | 4/2004 | |
| DE | 20 2004 012 032 | 11/2004 | |
| DE | 10 2006 004 016 | 8/2007 | |
| DE | 10 2006 034 726 | 1/2008 | |
| DE | 10 2006 042 498 | 3/2008 | |
| DE | 10 2007 055 914 | 7/2008 | |
| DE | 10 2007 056 277 | 6/2009 | |
| DE | 102009040405 A1 * | 3/2011 | ............ B60R 21/38 |
| DE | WO 2011026811 A1 * | 3/2011 | ............ B60R 21/38 |
| DE | 10 2011 118 856 | 5/2013 | |
| JP | EP 1705382 A1 * | 9/2006 | ............ B60R 21/38 |
| JP | WO 2008026423 | 3/2008 | |

* cited by examiner

ADJUSTING DEVICE FOR A FRONT LID AND ASSOCIATED MOTOR VEHICLE

CROSS-REFERENCES TO RELATED APPLICATIONS

This application claims the priority of German Patent Application, Serial No. 10 2013 017 456.2, filed Oct. 21, 2013, pursuant to 35 U.S.C. 119(a)-(d), the content of which is incorporated herein by reference in its entirety as if fully set forth herein.

BACKGROUND OF THE INVENTION

The present invention relates to an adjusting device for a front lid with an actuator for raising the rear edge of the front lid.

The following discussion of related art is provided to assist the reader in understanding the advantages of the invention, and is not to be construed as an admission that this related art is prior art to this invention.

To reduce the risk of injury to pedestrians in a collision with a motor vehicle, front lids have been developed, which can be actively raised following the detection of an impact, so that a part of the impact energy can be absorbed through deformation of the front lid. Such active lids are generally moved vertically upward and in addition rearward. By raising the front lid, a deformation space is formed between the cover and the engine compartment. The raised position of the front lid is also known as pedestrian safety position; where appropriate, a so-called type damage position may also be provided where the front lid can additionally be moved to a position that is raised even further and offset even more toward the rear. A motor vehicle equipped with such adjusting device has a sensor that is capable to detect an imminent or currently occurring impact with a pedestrian or another road user. Following the detection, the rear edge of the front lid is raised by the actuator in the aforedescribed manner.

It would therefore be desirable and advantageous to obviate prior art shortcomings and to provide an improved adjusting device for a front lid of a vehicle that provides enhanced locking capabilities.

SUMMARY OF THE INVENTION

According to one aspect of the present invention, an adjusting device for raising a rear edge of a front lid includes an actuator having a first linear drive constructed to impart on the front lid a substantially vertical movement and a second linear drive constructed to impart on the front lid a substantially horizontal movement.

The invention is based on the recognition that the front lid can be moved from an initial position to a final position by a combined operation of two linear drives. Since the movement of the front lid, or more specifically the movement of the rear edge of the front lid, is a combination or superposition of the movements of the two linear drives, a complicated kinematics which is partly required in conventional locking mechanisms, can be eliminated. The adjusting device according to the invention has therefore a comparatively simple structure and a small footprint. Since the two linear drives are arranged substantially orthogonal to each other, practically any point within a specified area can be reached. By suitably controlling the linear drives, the adjustment according to the invention can thus perform different opening movements.

According to an advantageous feature of the present invention, the first linear drive may have an attachment point that is that is fixed in relation to the vehicle body and a second attachment point that is disposed at a lockable section of the second linear drive. The two linear drives are here coupled to each other such that actuation of the first linear drive, i.e. a movement of the adjustable section, which may be formed, for example, as a piston, a cylinder, a rack and the like, moves at the same time the second linear drive. In this embodiment, the two linear drives are therefore coupled because the second linear drive is linearly displaced upon actuation of the first linear drive. It does not matter whether the first linear drive performs the horizontal motion or the vertical motion, as both variants and alternatives are possible.

In the adjusting device according to the invention, the adjustable section of the second linear drive may advantageously be displaced along a guide that is fixed in relation to the front lid.

The guide that is fixed in relation to the front lid is arranged such that a displacement of the front lid in the horizontal direction is initiated upon actuation of the associated linear drive. In this way, the front lid can be moved from a normal position, in which the front lid is "retracted", to a raised position that is shifted toward the rear of the vehicle. Again, it does not matter whether the first linear drive or the second linear drive is movable along the guide that is fixed in relation to the front lid.

According to another advantageous feature of the present invention, a particularly reliable operation of the adjusting device is obtained when the first and the second linear drive are connected to one another in an articulated manner. The connection formed between the two linear drives enables a rotation of the front lid when being raised.

According to another advantageous feature of the present invention, the first linear drive may have a attachment point that is fixed in relation to the body and a first attachment point that is fixed in relation to the front lid, while the second linear drive has a second attachment point that is fixed in relation to the body and a second attachment point that is fixed in relation to the front lid. The two attachment points that are fixed in relation to the body and two attachment points that are fixed in relation to the front lid are each arranged with a spacing therebetween. Accordingly, the two linear drives each have separate or spaced-apart attachment points. The two linear drives or their adjustable sections therefore engage at different points of the front lid. One linear drive is responsible for a substantially horizontal movement of the front lid, whereas the other linear drive is responsible for a substantially vertical movement of the front lid.

According to another advantageous feature of the present invention, in order to form an assembly, the two attachment points of the adjusting device according to the invention that are fixed in relation to the front lid may be positioned at opposite ends of a leg that is fixed in relation to the front lid. In this embodiment, the leg that is fixed in relation to the front lid is advantageously mounted in the longitudinal direction of the vehicle, with a respective linear drive engaging at both ends of the leg. The two engagement points of the linear drives are thus spaced apart by the leg, thus producing a specific predetermined kinematics. The entire adjusting device with the two linear drives and the leg that is fixed in relation to the front lid forms a pre-assembled unit. For proper operation of the adjusting device according to the invention, the linear drives may advantageously be hinged to the attachment points that are fixed in relation to the vehicle body and to the front lid, respectively.

In all variants of the adjusting device according to the invention, the adjusting device may have a control device, or may be connectable or connected to a control device, which is configured to control the first and the second linear drive in a coordinated fashion. The control device may cooperate with one or more safety systems of the motor vehicle, for example, with a system for detecting an impact with a pedestrian. When an existing or impending dangerous situation, such as a currently occurring impact with a pedestrian, has been detected, the control device controls the two linear drives of the adjusting device according to the invention so that the front lid is moved upward and towards the rear of the motor vehicle, thereby forming a deformation space between the front lid and the engine compartment. Preferably, a motor vehicle according to the invention has two adjusting devices, which may be constructed identically or symmetrically with respect to the longitudinal axis of a motor vehicle. The front lid can then be raised symmetrically or synchronously, preferably by the adjusting devices arranged opposite to each other on the left and on the right.

In the adjusting device according to the invention, the control device may advantageously be configured to control the linear drives, so that the rear edge of the front lid can be moved to a raised, rearward-shifted pedestrian protection position or to an even further raised and even further rearward-shifted type class position. In addition, other positions may be provided to facilitate, for example, the installation of the engine hood or to allow better access for maintenance work or repairs.

In the adjusting device according to the invention, the linear drives may advantageously be constructed as electric motors. A linear drive may have a spindle or a toothed rack or a piston enabling a linear movement.

The present invention is also directed to a motor vehicle. The motor vehicle according to the invention is characterized in that it has one or preferably two adjusting devices of the aforedescribed type that are mounted on opposite sides of the front lid.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
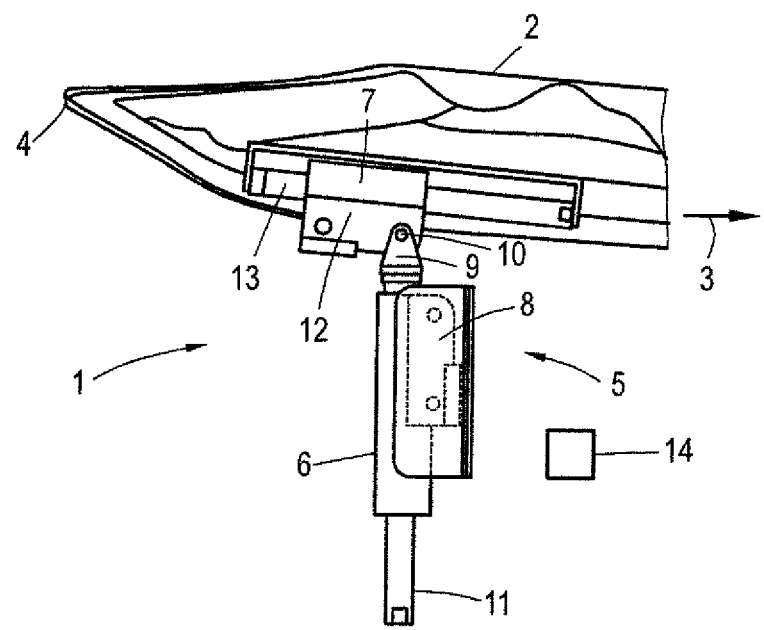
FIG. 1 a first exemplary embodiment of an adjusting device according to the present invention in an initial position.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an adjusting device 1, which is connected to a front lid 2 of a motor vehicle. An arrow 3 points towards the front of the motor vehicle; likewise, the reference symbol 4 designates the rear edge of the front lid 2.

The adjusting device 5 includes an actuator for raising the rear edge 4 of the front lid 2.

The actuator 5 includes a first linear drive 6, which enables a substantially vertical movement of the front lid 2, and a second linear drive 7, which enables a substantially horizontal movement of the front lid 2. The first linear drive 6 has an attachment point 8 that is fixed in relation to the vehicle body and a second attachment point 10 disposed on an adjustable section 9 of the second linear drive 7. The attachment point 8 that is fixed in relation to the vehicle body may be connected directly to the vehicle body, for example by a screw connection or a welded connection. However, other embodiments are also conceivable where the attachment point 8 that is fixed in relation to the vehicle body is connected to another component, which is in turn connected to the vehicle body. In the illustrated embodiment, the first linear drive 6 is constructed as a spindle drive and includes an (unillustrated) electric motor, with can be used to vertically move a spindle 11 on which the adjustable section 9 is located.

The second linear drive 7 also includes an electric motor, with can be used to displace an adjustable section 12 along a guide 13 that is fixed in relation to the front lid. Depending on the installation situation of the second linear drive 7, the second linear drive 7 may enable either a horizontal movement of the front lid 2 relative to the vehicle body or a slightly inclined movement, as shown in FIG. 1.

The two linear drives 6, 7 are connected with each other at the second attachment point 10 located at the end of the adjustable section 9 of the first linear drive 6. When the first linear drive 6 is displaced vertically, the adjustable section 9 is moved vertically upward from the initial position shown in FIG. 1. Because the two linear drives 6, 7 are coupled, the entire second linear drive 7 and the front lid 2 connected thereto are moved vertically upward. When the second linear drive 7 is operated along the guide 13 that is fixed in relation to the front lid 2, the front lid 2 is displaced relative to the body of the motor vehicle. From the initial position shown in FIG. 1, the front lid 2 can be moved substantially rearward, i.e. toward the rear edge 4.

Figure 2:
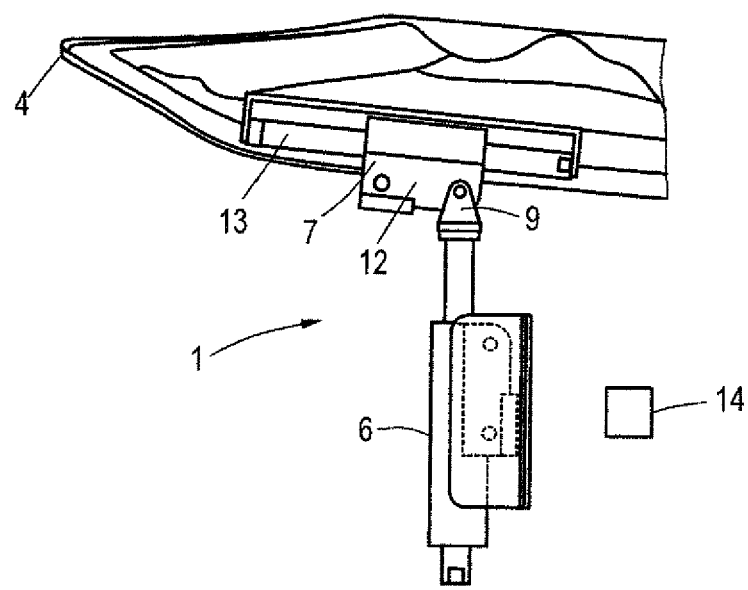
FIG. 2 the adjusting device of FIG. 1 in a different position.

FIG. 2 shows the adjusting device 1 in a position that is shifted relative to the initial position of FIG. 1. It is evident from FIG. 2 that the adjustable section 9 of the first linear drive 6 has been shifted vertically upward by operating the associated electric motor. In addition, the front lid 2 was shifted from the initial position shown in FIG. 1 in the direction of the rear edge 4 by operating the second linear drive 7. FIG. 2 shows that the adjustable section 12 of the second linear drive 7 is located approximately in the middle of the guide 13 that is fixed in relation to the front lid. The articulated connection of the two linear drives 6, 7 enables the rotation of the front lid 2 with respect to its fulcrum commensurate with the adjustment. The position shown in FIG. 2 is a pedestrian protection position, wherein the front lid 2 is shifted from the initial position shown in FIG. 1 vertically upward and toward the rear of the motor vehicle.

Figure 3:
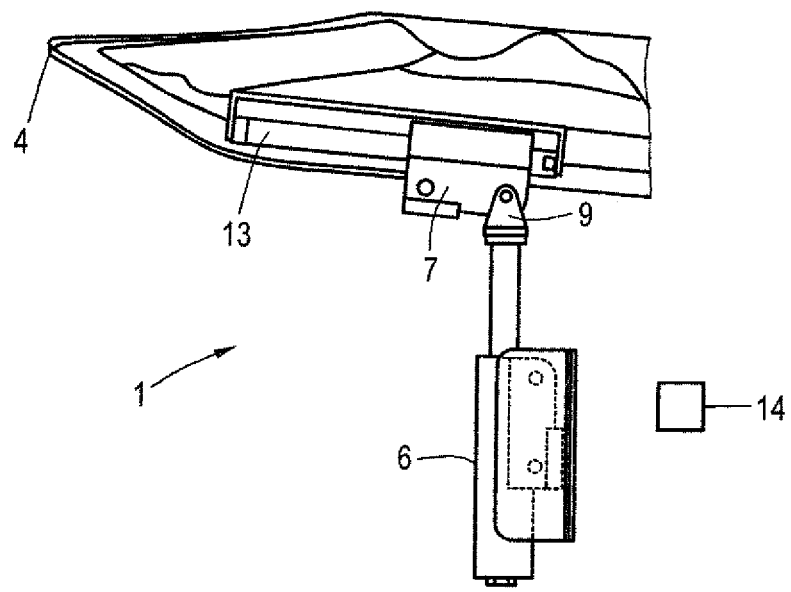
FIG. 3 the adjusting device of FIG. 1 in another position.

FIG. 3 shows the adjusting device 1 in a position that is shifted even further vertically upward and even further toward the rear compared to the position of FIG. 2. The adjustable section 9 of the first linear drive 6 has here almost reached its highest vertical position. Likewise, the adjustable section 12 of the second linear drive 7 is almost at an end of the guide 13 that is fixed in relation to the front lid FIGS. 1-3 show schematically a control device 14, which is connected via (unillustrated) electrical cables with the two linear drives 6, 7. In addition, the control device 14 is connected to a system for detecting an impact. When an impact is detected, the control device 14 controls the two linear drives 6, 7 in a coordinated fashion, in particular to one of the positions shown in FIG. 2 and FIG. 3. The position shown in FIG. 3 is referred to as type damage position.

Figure 4:
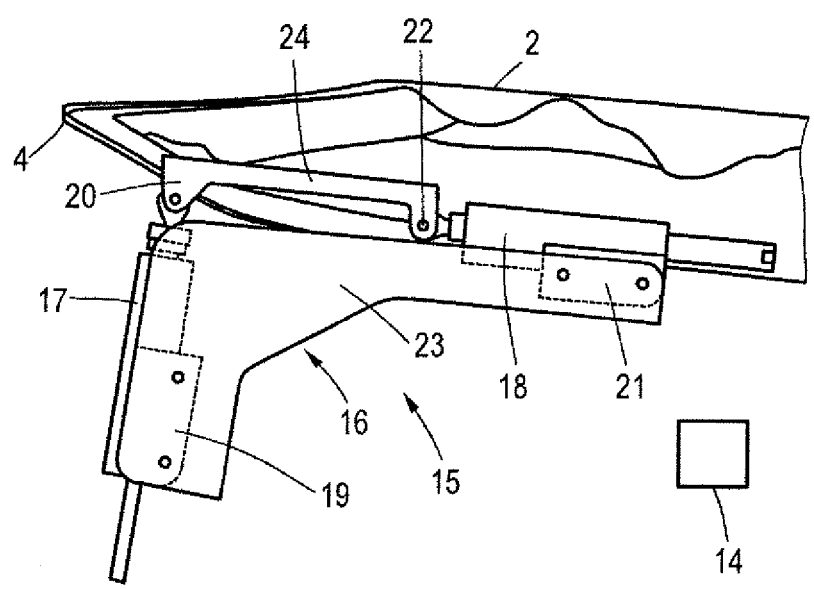
FIG. 4 a second exemplary embodiment of an adjusting device according to the present invention in an initial position.
Figure 5:
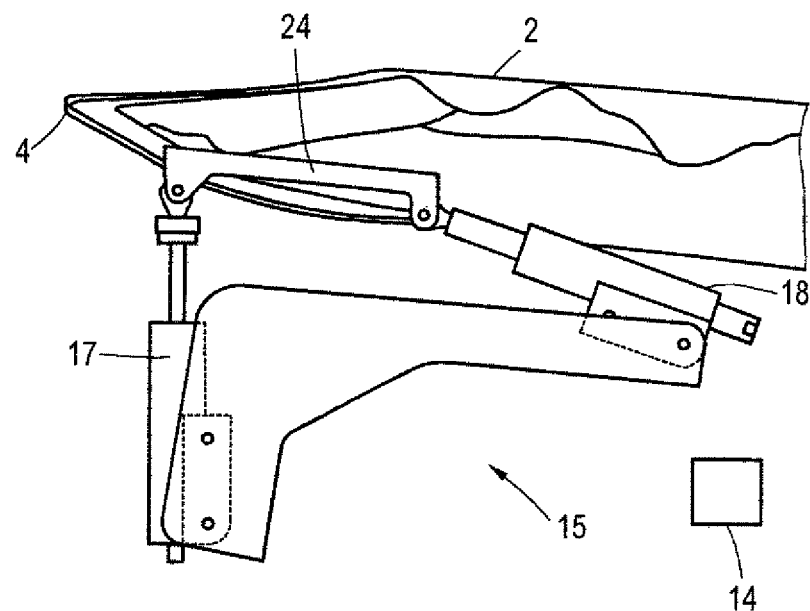
FIG. 5 the adjusting device of FIG. 4 in a different position.
Figure 6:
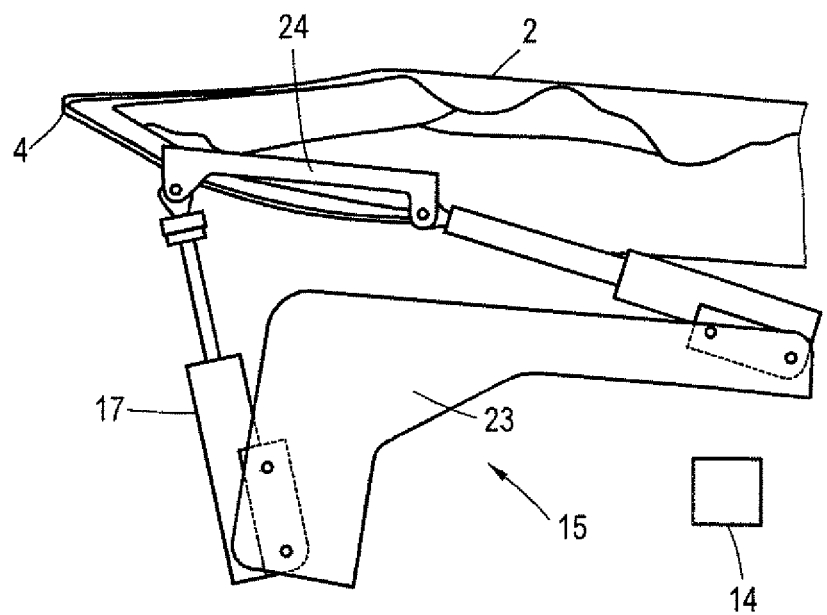
FIG. 6 the adjusting device of FIG. 4 in another position.

FIGS. 4-6 show a second embodiment of an adjusting device 15 having an actuator 16 for raising the rear edge 4 of the front lid 2. The actuator 16 includes a first linear drive 17, which enables a substantially vertical movement of the front lid 2, and a second linear drive 18, which enables a substantially horizontal movement of the front lid 2.

A detailed description of those components that correspond to those of the first embodiment is omitted here.

The first linear drive 17 includes a first attachment point 19 that is fixed in relation to the vehicle body and a first attachment point 20 that is fixed in relation to the front lid. The second linear drive 18 has a second attachment point 21 that is fixed in relation to the vehicle body and a second attachment point 22 that is fixed in relation to the front lid. FIG. 4 shows that the two attachment points 19, 21 that are fixed in relation to the vehicle body are arranged on a metal plate 23. The metal plate 23 is in turn connected in an unillustrated manner with the body of the motor vehicle. However, other embodiments are conceivable wherein the attachment points 19, 21 that are fixed in relation to the vehicle body are connected directly to the body, in particular screwed.

In the exemplary embodiment shown in FIG. 4, the attachment points 20, 22 that are fixed in relation to the front lid are spaced apart. The two attachment points 20, 22 are located at opposite ends of a leg 24 that is fixed in relation to the front lid. In this way, the adjusting device 15 forms a pre-assembled unit.

FIG. 4 shows only one adjusting device 15; however, a motor vehicle has two adjusting devices 15 mounted on the left and on the right of the front lid 2.

FIG. 5 shows the adjusting device 15, after the two linear drives 17, 18 have been operated. Starting from the initial position shown in FIG. 5, the adjustable section 4 of the first linear drive 17 was shifted vertically upward so that the front lid 2 was shifted vertically upward in the region of its rear edge 4. The second linear drive 18 was also operated by the control device 14 so that its adjustable section was shifted toward the rear edge 4. The superposition of these movements causes the region of the rear edge of the front lid 2 to shift vertically upward and rearward, i.e. towards the rear edge 4 of the vehicle. The control device 4 controls the two linear drives 17, 18 in a coordinated fashion, thereby eliminating constraining forces. The articulated support of the two linear drives 17, 18 enables the movement of the front lid 2. FIG. 5 shows the front lid 2 in the pedestrian protection position.

FIG. 6 shows the type damage position wherein the adjustable section of the first linear drive 17 is extended to the maximum. As can be seen in FIG. 6, the first linear drive 17 has been rotated relative to the metal plate 23, which is made possible by the articulated support. The second linear drive 18 is also maximally deflected, wherein the front lid 2 has been moved toward the rear to the maximum.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An adjusting device for raising a rear edge of a front lid, comprising:
   an actuator having a first linear drive constructed to impart on the front lid a substantially vertical movement and a second linear drive constructed to impart on the front lid a substantially horizontal movement,
   wherein the first linear drive has an attachment point that is fixed in relation to the vehicle body and a second attachment point arranged on an adjustable section of the second linear drive, and
   wherein the adjustable section of the second linear drive is displaceable along a guide that is fixed in relation to the front-cover.

2. The adjusting device of claim 1, wherein the first and the second linear drive are connected to one another in an articulated fashion.

3. The adjusting device of claim 1, wherein the adjusting device is configured to be connected to a control device, with the control device being configured to control the first and second linear drive in a coordinated fashion.

4. The adjusting device of claim 1, wherein the linear drives comprise electric motors.

5. An adjusting device for raising a rear edge of a front lid, comprising:
   an actuator having a first linear drive constructed to impart on the front lid a substantially vertical movement and a second linear drive constructed to impart on the front lid a substantially horizontal movement; and
   a control device configured to control the first and second linear drive in a coordinated fashion, so as to move the rear edge of the front lid to a raised and rearward displaced pedestrian protection position or to an even further raised and even further rearward displaced type-class position.

6. A motor vehicle comprising an adjusting device for raising a rear edge of a front lid, the adjusting device comprising an actuator having a first linear drive constructed to impart on the front lid a substantially vertical movement and a second linear drive constructed to impart on the front lid a substantially horizontal movement,
   wherein the first linear drive has an attachment point that is fixed in relation to the vehicle body and a second attachment point arranged on an adjustable section of the second linear drive, and wherein the adjustable section of the second linear drive is displaceable along a guide that is fixed in relation to the front-cover.

* * * * *